United States Patent [19]

Curry

[11] Patent Number: 5,396,963

[45] Date of Patent: Mar. 14, 1995

[54] BLADES FOR EARTH MOVING MACHINES

[76] Inventor: John N. Curry, 16 Anthony Close, Lower Plenty, VIC, Australia

[21] Appl. No.: 211,610

[22] PCT Filed: May 29, 1992

[86] PCT No.: PCT/AU92/00248

§ 371 Date: Apr. 8, 1994

§ 102(e) Date: Apr. 8, 1994

[87] PCT Pub. No.: WO93/07344

PCT Pub. Date: Apr. 15, 1993

[30] Foreign Application Priority Data

Oct. 9, 1991 [AU] Australia ................. PK8794
Apr. 2, 1992 [AU] Australia ................. PL1655

[51] Int. Cl.6 ............................... E02F 9/28
[52] U.S. Cl. .................... 172/701.3; 172/753; 37/452; 37/453; 403/381
[58] Field of Search ............... 403/381; 299/91; 172/719, 762, 770, 701, 701.1, 701.2, 701.3, 753, 445.1; 37/452, 453, 455

[56] References Cited

U.S. PATENT DOCUMENTS

| | | |
|---|---|---|
| 989,729 | 4/1911 | Swindle . |
| 1,944,307 | 1/1934 | Spoon . |
| 2,073,801 | 3/1937 | Linden ................. 172/719 |
| 2,085,520 | 6/1937 | Weisel ................. 172/719 |
| 2,584,868 | 2/1952 | Guess . |
| 2,708,865 | 5/1955 | Frevick et al. . |
| 2,778,129 | 1/1957 | Fryer . |
| 3,082,555 | 3/1963 | Hill ................. 403/381 X |
| 3,190,018 | 6/1965 | Nelson et al. . |
| 3,684,032 | 8/1972 | Hawkins ............. 403/381 X |
| 3,864,853 | 2/1975 | Klett et al. . |
| 4,036,307 | 7/1977 | Marais ............. 172/753 X |
| 4,108,250 | 8/1978 | Merkel . |
| 4,300,271 | 11/1981 | Wohlhaupter ......... 403/381 X |
| 4,390,071 | 6/1983 | Wright . |
| 4,457,380 | 7/1984 | Curry . |
| 5,005,304 | 4/1991 | Briscoe et al. ........ 403/381 X |
| 5,063,695 | 11/1991 | Briscoe et al. ........ 403/381 X |

Primary Examiner—Randolph A. Reese
Assistant Examiner—Robert Pezzuto
Attorney, Agent, or Firm—Pennie & Edmonds

[57] ABSTRACT

A cutting-edge member for scraper blades having interlocking engagement with adjacent members, each cutting edge member being adjustable and reversible in a position relative to the other members. The interlocking engagement is achieved by the use of non-tapered, angled dove-tailed members spaced along each side of the cutting edge member and being separated by recesses, each dove-tailed member being of a size and shape the same as each of the recesses.

7 Claims, 3 Drawing Sheets

BLADES FOR EARTH MOVING MACHINES

This invention relates to improvements in blades for earth moving machines such as scrapers, graders, bulldozers and so on (hereinafter referred to as "scrapers") and it refers particularly to the cutting edges- the operative cutting edge portions of the blades.

The ground-engaging tools of bulldozers, scrapers, graders and other earth moving machines are made in a wide variety of types, according to the purposes for which the tools are to be used. In general, there are replaceable edge members capable of being bolted in position on a support assembly, such as a scraper moldboard, and those edge members may be made to suit a level cut arrangement (with the front edges of the several members all in line), in a drop centre or stinger arrangement (when the middle part projects forwardly of the two or more side parts), with integral forwardly-projecting teeth, with replaceable forwardly projecting teeth, substantially planar in shape, or, if necessary, curved, with front and rear edges so that they may be reversed, and so on. The edge members for a machine may be made in one piece to extend the full width of the tools to which they are to be attached or they may be made in shorter sections so that three four or more members are bolted in position on a support member to make up the full width of the earth-engaging tool.

In my earlier U.S. Pat. No. 4,457,380 there is described and defined a blade for scrapers. However, that blade has been found to have certain limitations. If it is desired to remove a female blade to either rotate it or replace due to wear, or for any other reason, both that blade and the adjacent two male blades, must be removed. Also, it is difficult to rotate just the one female blade due to every second blade being different.

This invention is applicable to all such edge members but for simplicity of description they will be referred to as cutting edges or edge members for scraper blades without limiting the invention to the blades of such machines.

This invention has been devised particularly with the object of providing a construction of cutting edge for a scraper blade such that the range of use of the cutting edge will be greatly increased. Another object is to provide cutting edges so constructed that they may be individually reversed in position, interchanged, and/or used in the straight or level-cut operational position or in the so-called "drop" or "stinger" position, as required. A further object is to provide cutting edges which, individually, will be easy to replace and/or adjust in position.

Yet another object is to provide a cutting edge of such constructions that a broken or worn part of the cutting edge may be replaced without the necessity of replacing the whole cutting edge.

The invention devised with these and other objects in view provides cutting edge members for scraper blades having means for interlocking with adjacent cutting edges whereby each cutting edge, when securely mounted in position on a scraper moldboard, will be engaged with the adjacent cutting edge or edges, the cutting edge members being adjustable and reversible in position one relative to the other.

It is preferred that the means for interlocking be angle dovetailed parts on the opposite side edges of the cutting edge members so arranged that when two such cutting edge members are mounted on a scraper moldboard in side-by-side relationship the angled dovetailed parts on one side of one such cutting edge member will interengage with those on the adjacent side of the next cutting edge member. It is also preferred that each of the cutting edge members be provided with at least two fastening holes by which it may be fastened to the scraper blade, and that the dovetailed parts have a spacing or pitch related to the location and spacing of said holes so that if a cutting edge member is moved, relative to an adjacent cutting edge member, the dovetailed parts will still interengage so as to lock together the two said cutting edge members.

The angled dovetailed parts on one cutting edge member are not tapered, so that they are the same width at the top as at the bottom, the recesses between said dovetail parts being the same shape as the dovetail parts of the first-mentioned cutting edge member. Thus, the cutting edge members will be adapted to interlock in the longitudinal direction and transverse directions, and in the vertical direction as well-considering the cutting edge members as being horizontal.

In order to provide for a reversal of each cutting edge member so that, when one end is worn, it may be turned end-for-end and an unworn end put into operational position, each end is shaped to provide a desired "edge" and the dovetailed parts of the two different cutting edge members will be arranged so that they will interengage even when one of them is reversed in position relative to the other without any change in related position of the fastening holes.

With the present invention, the two cutting edges are substantially parallel so that rotation about the horizontal transverse axis of the cutting edge member is required to effect reversal.

Also, the spacing or pitch of the angled dovetailed parts in relation to the spacing of the fastening holes is such that one cutting edge member may be moved longitudinally relative to the adjacent members into a drop center or stinger position, and be bolted in that position.

In order that the invention may be readily understood and conveniently put into practical form I shall now describe with reference to the accompanying illustrative drawings one exemplary construction of cutting edges for moving machines:

Figures 1, 2, 3:
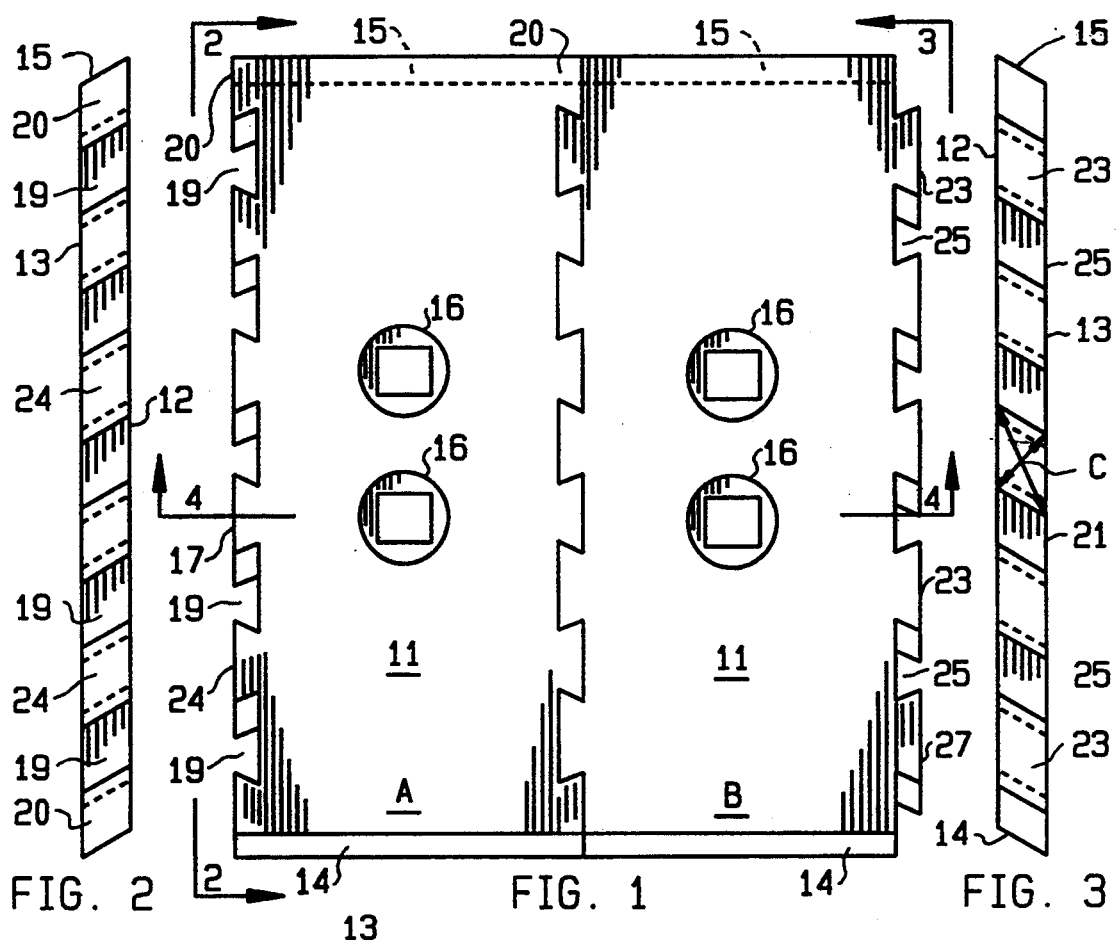
FIG. 1 is a plan view of a pair of members in interengaged relationship.
FIG. 2 is a side view in the direction of arrow 2 of FIG. 1.
FIG. 3 is a side view in the direction of arrow 3 of FIG. 1.
Figure 4:
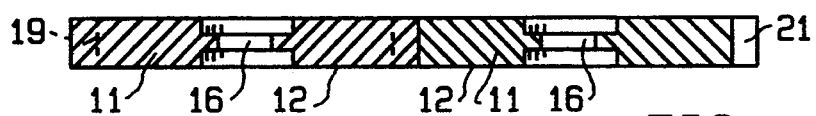
FIG. 4 is a transverse cross-section on the line and in the direction of arrows 4—4 of FIG. 1.
Figure 5:
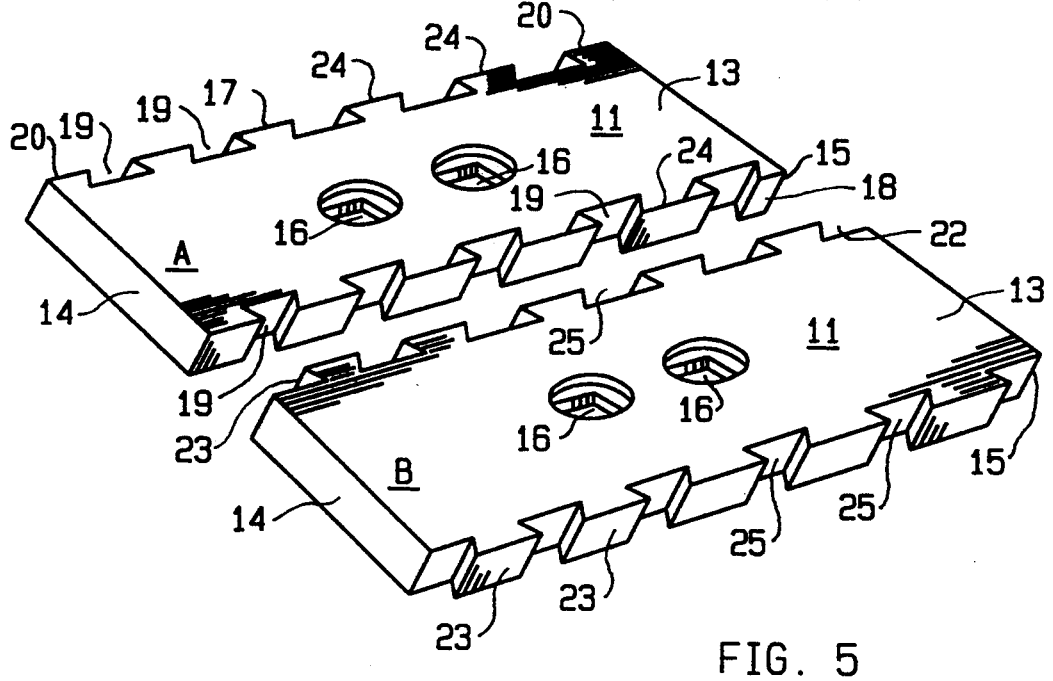
FIG. 5 is a perspective view of the two members of FIG. 1 prior to their interengagement.

According to this invention the cutting edge of a scraper (or other earth moving machine as defined above) is made up of a number of members A and members B which are arranged in side-by-side interengaging relationship. In these drawings only one of each member is illustrated but it will be appreciated that there are provided as many as may be required to extend the full width of the scraper blade.

Each of the members A and B has a body portion 11 with a flat underside 12, a flat upper side 13, substantially parallel front and rear ends 14 and 15 respectively each forming an edge, and opposite side walls made for interlocking engagement with the side walls of adjacent members. In each body portion 11 are two longitudinally spaced fastening holes 16 made to receive the fastening bolts by which the cutting edge members are fastened to the scraper moldboard. The effective width of each of the cutting edge members is such that when they are fastened together the fastening holes 16 will be spaced laterally a distance to suit the spacing of the fastening holes in the scraper moldboard The two side walls 17, 18 of each member A are provided with a series of undercut, angled dovetail recesses 19, which are of constant width from top to bottom, and end pieces 20 at the opposite ends. The side walls 21, 20 of each member B have a series of dovetail parts 23 of a shape, size and longitudinal spacing corresponding to the dimensions of the dovetail recesses 19 so as to be capable of being fitted thereinto.

The spacing of the dovetail recesses 19 is the same on the two sides of each member A and, similarly, the spacing of the male dovetail parts 23 is the same on each side of each member B. The dovetail recesses 19 and lands 24 between them are so arranged that on each side of each member A, a land 24 is in transverse alignment with a fastening hole 16, the pitch of the dovetail recesses 19 and of the dovetail parts 23 being the same as the longitudinal spacing of the fastening holes 16. The dovetail parts 23 are similarly spaced as the dovetail recesses 19 and extends along both sides of each member B. The dovetail parts 23 are separated by a series of undercut angled dovetail recesses 25, the spacing or pitch of the recesses 25 related to the spacing of the fastening holes 16.

The relationship between the spacing or pitch of the recesses 25 and spacing of the fastening holes 16 is such that the transverse centre-line of a hole 16 must pass through the point generally designated as C on FIG. 3, the point C being the intersection of the two diagonal lines of the recess 25.

Most preferably, and as illustrated, the recesses 19 and 25 are identical, as are the parts 23 and lands 24. In this way, the only difference between the members A and B is the location of the recesses 19,25 along their lengths, this being necessary for the interfitting of members A & B.

It is clear that with that arrangement and spacing of the dovetail recesses 19 and dovetail parts 23, when a number of members are connected together in interlocking arrangement, a member may be removed from the scraper mole blade to which it is fastened, reversed end-for-end about the horizontal transverse axis and re-engaged with the adjacent member or members.

Figure 6:
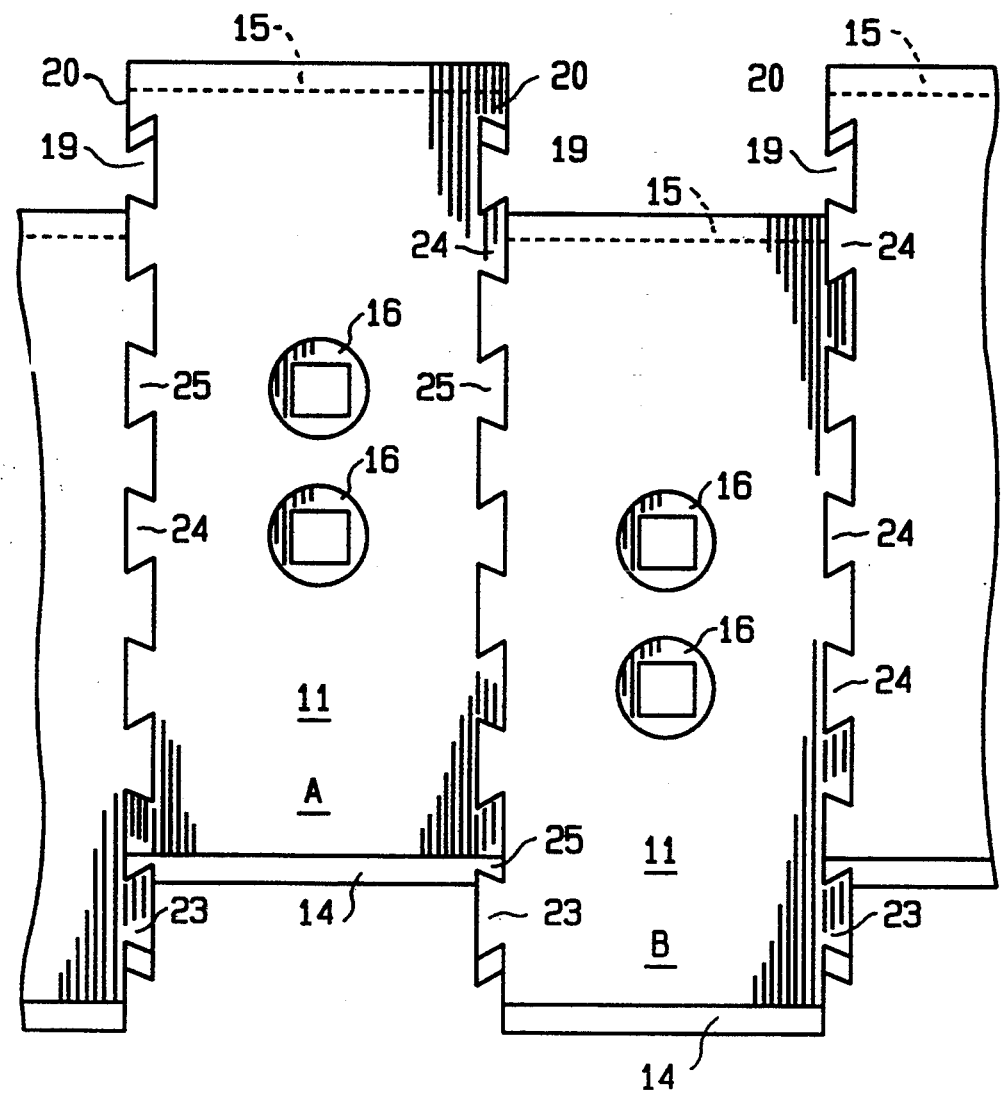
FIG. 6 shows a plan view of the members in adjusted relative positions.
Figure 7:
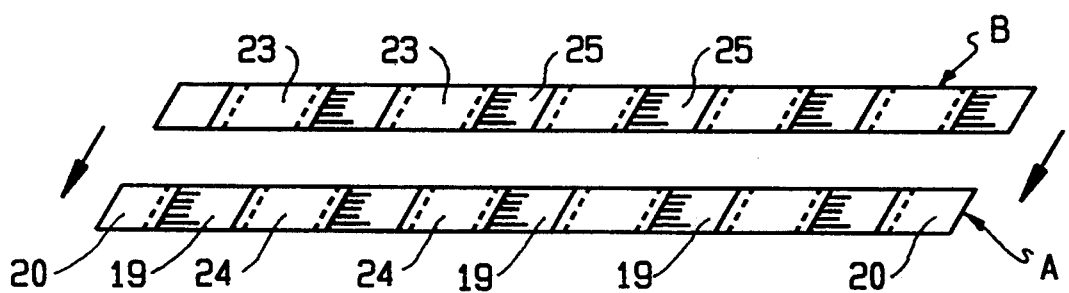
FIG. 7 is a side view of the members prior to interengagement.

Further, if it is desired to set a number of the cutting edge members in the drop position those members may be moved longitudinally forwards in relation to the remaining members, in the manner as illustrated in FIG. 6, by the amount of one or more pitches of the dovetail parts 23 and then re-bolted in position.

It is believed that when a number of cutting edge members made according to the invention are correctly bolted to a scraper moldboard and the scraper is being so operated that the cutting edges dig into the ground the pressure on the several edge members is in an anti-clockwise direction and the individual edge members will lock with the adjacent members by virtue of the undercut nature of the recesses 19,25 and corresponding shape of the parts 23,24; similarly, when the machine is operated to move forwardly the pressure on the edge members is in the opposite direction, and the individual edge members will again lock with adjacent members of the interengaging dovetail parts.

Figures 8, 9:
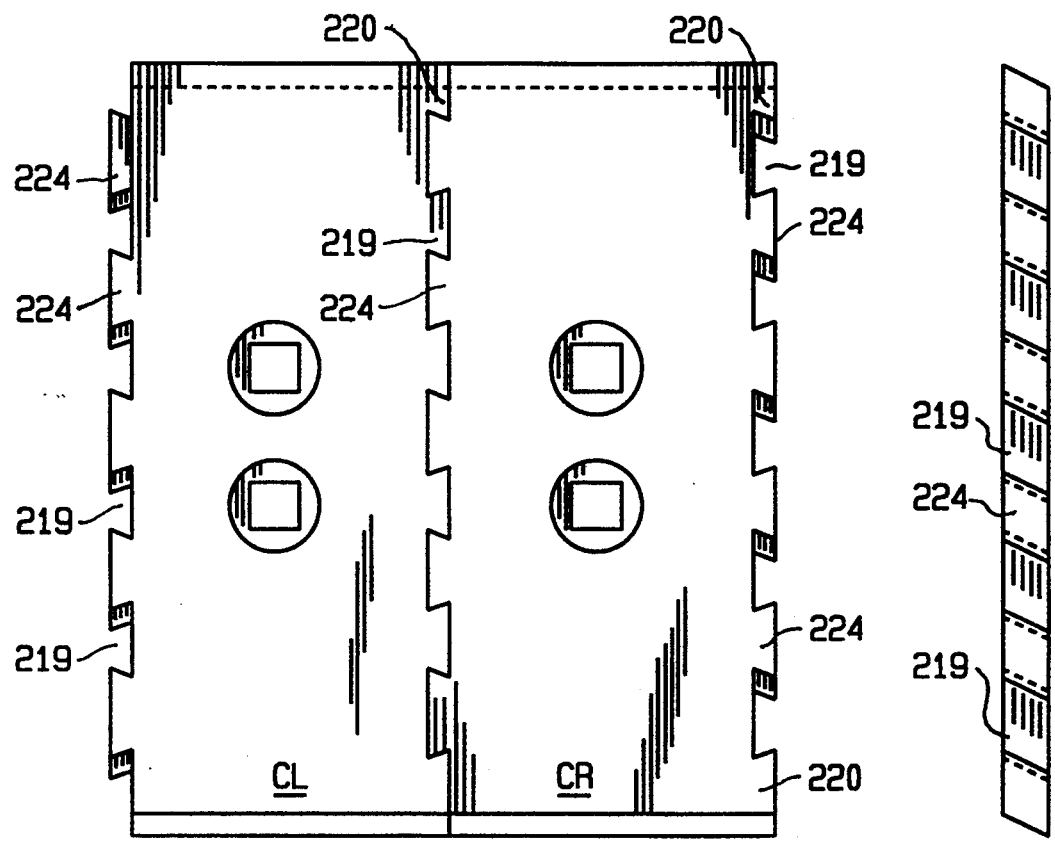
FIG. 8 is a plan view of a pair of members of a second embodiment in interengaged relationship.
FIG. 9 is a side view in the direction of arrow 9 of FIG. 8.
Figure 10:
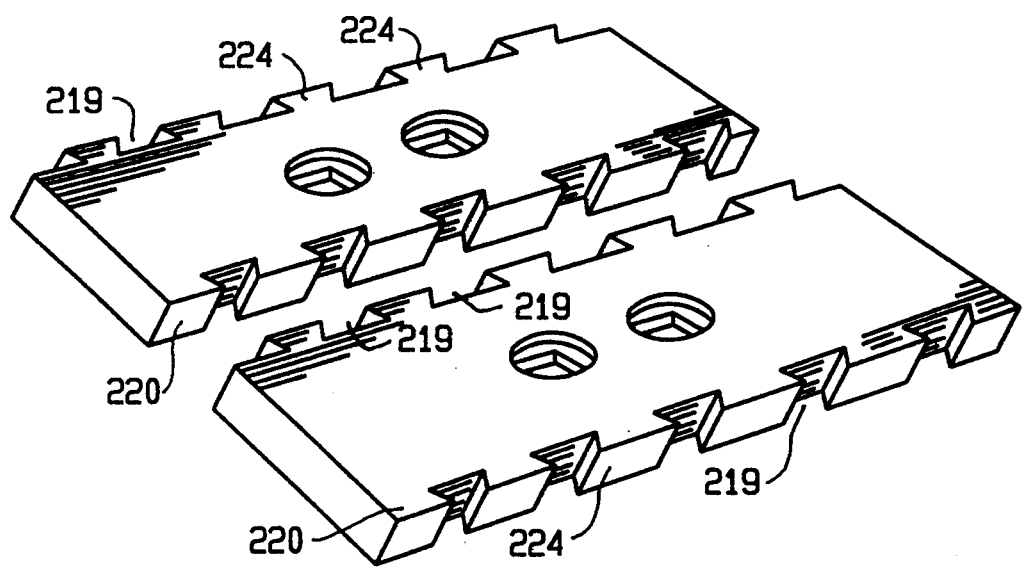
FIG. 10 is a perspective view of the two members of FIG. 8 prior to their interengagement.

FIGS. 8 to 10 illustrate an alternative embodiment. Here, the two members, now both marked C, are identical. The left member, indicated by the addition of the suffix letter L, has on its right side a series of undercut, angled, dovetailed recesses 219, the recesses being identical to the recesses 19. Between the recesses 219 are lands 224, identical to the lands 24. At each end would be end pieces 220. On its left side, the member CL has again a series of undercut, angled, dovetailed recesses 219 and lands 224. The left side has its lands 224 aligned transversely with the recesses 219 of the right side. The right of the two members, indicated by the addition of the suffix letter R, has the same recesses 219 and lands 224 and the member CL, and is identical to the member CL. In this way, a plurality of identical members C can be laid side-by-side in correct alignment. Naturally, an end member (not shown) may be added at each or either end of the installation, if desired.

As the cutting edge members are made relatively narrow in the transverse direction each cutting edge members will be substantially lighter than cutting edges as hitherto provided and one man will be able to handle them with ease, so that one operator may replace or change the position of a cutting edge member, or a number of cutting edge members, on his own.

It will be understood that the cutting edge members as herein described may be made as toothed cutting edge members-each said cutting edge member having one or more teeth at one or both ends-or they may be made to support replaceable teeth in known manner.

It is to be appreciated that other modifications in details of design, construction and/or arrangement may be made and that the invention is not limited to the particular constructions of cutting edges described above in detail. All such modifications are to be deemed to be included in the ambit of the invention as described.

I claim:

1. A cutting-edge member for scraper blades having means for interlocking engagement with adjacent like cutting-edge members, each cutting edge member being adjustable and reversible in position relative to said adjacent like cutting-edge members, said means for interlocking comprising non-tapered angled dovetailed members spaced along each side of each cutting-edge member and being separated by recesses, each dovetailed member being of a size and shape the same as each of said recesses.

2. A cutting-edge member as claimed in claim 1, wherein each dovetailed member has parallel side walls which are undercut and are also inclined to the vertical.

3. A cutting-edge member as claimed in claim 1, wherein there is provided at least two fastening holes by which said cutting-edge member may be fastened to said scraper blade.

4. A cutting-edge member as claimed in claim 2, wherein said dovetailed members have a spacing related to the location and spacing of said fastening holes.

5. A cutting-edge member as claimed in claim 1 wherein each end has an edge, said edges being substantially parallel.

6. A cutting-edge member as claimed in claim 1 wherein said dovetailed members along one side of cutting-edge members are transversely aligned with said recesses along the other side of said cutting-edge member.

7. A cutting-edge member as claimed in claim 1, wherein said reversibility is by removing the cutting-edge member and pivoting about the horizontal transverse axis of said cutting edge member.

* * * * *